(12) United States Patent
Konta

(10) Patent No.: US 12,474,754 B2
(45) Date of Patent: Nov. 18, 2025

(54) ELECTRONIC APPARATUS, METHOD FOR CONTROLLING THE SAME, AND STORAGE MEDIUM

(71) Applicant: CANON KABUSHIKI KAISHA, Tokyo (JP)

(72) Inventor: Miho Konta, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/733,221

(22) Filed: Jun. 4, 2024

(65) Prior Publication Data
US 2024/0413634 A1 Dec. 12, 2024

(30) Foreign Application Priority Data
Jun. 12, 2023 (JP) .................. 2023-096468

(51) Int. Cl.
*G06F 1/26* (2006.01)
*G06F 1/3212* (2019.01)
(Continued)

(52) U.S. Cl.
CPC ............ *G06F 1/263* (2013.01); *G06F 1/3212* (2013.01); *H01M 10/488* (2013.01);
(Continued)

(58) Field of Classification Search
CPC .......... G06F 1/3212; G06F 1/263; G06F 1/26; H02J 7/0048; G03B 7/26; H01M 10/488;
(Continued)

(56) References Cited

U.S. PATENT DOCUMENTS

2012/0139503 A1 6/2012 Saeki
2014/0015320 A1* 1/2014 Takano .................. H02J 7/04
307/38
(Continued)

FOREIGN PATENT DOCUMENTS

JP H11111347 A 4/1999
JP 2009250953 A 10/2009

OTHER PUBLICATIONS

The above patent documents were cited in a European Search Report issued on Oct. 23, 2024, which is enclosed, that issued in the corresponding European Patent Application No. 24181290.8.

*Primary Examiner* — Ryan Johnson
(74) *Attorney, Agent, or Firm* — Cowan, Liebowitz & Latman, P.C.

(57) ABSTRACT

An electronic apparatus obtains, from a battery, information about remaining power in the battery; detects a connection with a power supply apparatus, performs control to supply power from the power supply apparatus instead of from the battery, in a case where the connection with the power supply apparatus is detected; and displays a warning related to the remaining power in the battery when the remaining power in the battery is less than or equal to a predetermined threshold, in a case where the electronic apparatus operates using the power from the battery. In a case where the connection with the power supply apparatus is detected, the electronic apparatus displays the warning related to the remaining power in the battery when the remaining power in the battery is less than or equal to a second threshold.

1 Claim, 8 Drawing Sheets

(51) Int. Cl.
  *H01M 10/48* (2006.01)
  *H02J 7/00* (2006.01)
  *H04N 1/00* (2006.01)
  *H04N 23/63* (2023.01)
  *H04N 23/65* (2023.01)

(52) U.S. Cl.
  CPC ....... *H02J 7/0048* (2020.01); *H04N 1/00899* (2013.01); *H04N 23/634* (2023.01); *H04N 23/65* (2023.01)

(58) Field of Classification Search
  CPC ... H04N 1/00899; H04N 23/634; H04N 23/65
  See application file for complete search history.

(56) References Cited

U.S. PATENT DOCUMENTS

| | | | |
|---|---|---|---|
| 2014/0375273 A1 | 12/2014 | Harada | |
| 2019/0238706 A1* | 8/2019 | Sakai | H04N 1/00907 |
| 2020/0209941 A1 | 7/2020 | Shiba | |

* cited by examiner

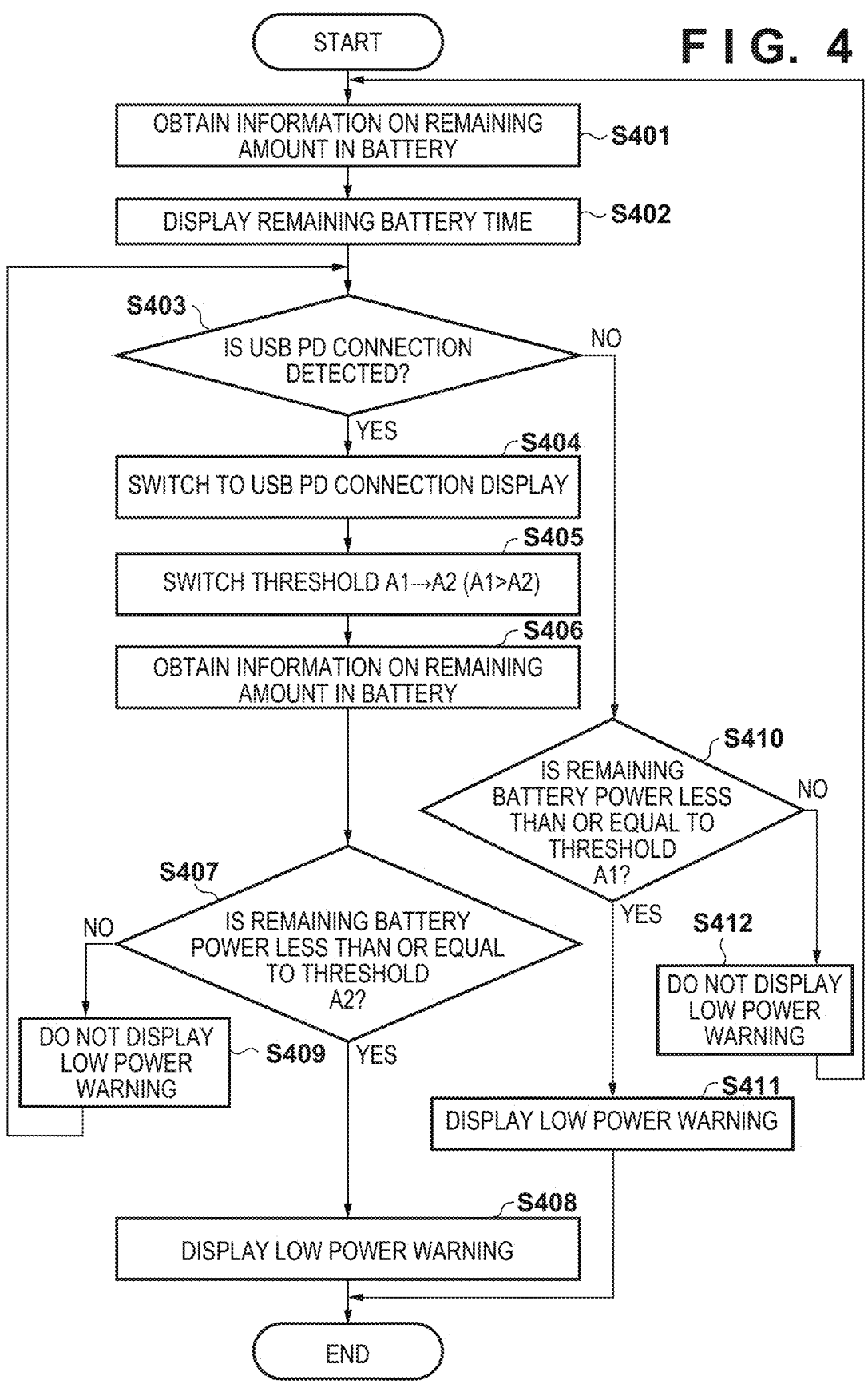

ELECTRONIC APPARATUS, METHOD FOR CONTROLLING THE SAME, AND STORAGE MEDIUM

BACKGROUND OF THE INVENTION

Field of the Invention

The present invention relates to an electronic apparatus, a method for controlling the same, and a storage medium.

Description of the Related Art

Some devices that use battery power to shoot images indicate the remaining time for which the device can be used with a numerical value, a level meter, or the like. In commercial video cameras, a loss of power during shooting can interrupt shooting and make it necessary to re-shoot images. Therefore, when the remaining battery power drops, it is useful to display a warning (in addition to the level meter or the like).

A technique is known for portable apparatuses in which when the output voltage of a battery, detected by a voltage detection circuit, falls below a threshold, an LED is lit to communicate a warning (Japanese Patent Laid-Open No. H11-111347). Meanwhile, the charging capacity of a rechargeable battery decreases due to deterioration over time, and thus a technique is known in which a threshold is corrected according to the state of deterioration in order to reduce errors in the remaining usable time and provide warnings (Japanese Patent Laid-Open No. 2009-250953).

Incidentally, as the power supply standard known as universal serial bus (USB) power delivery (PD) spreads, an increasing number of apparatuses are capable of receiving power from power supply apparatuses that support USB Type-C terminals. Some such apparatuses can receive power supplied from a power supply apparatus over a USB Type-C cable while a removable battery is attached. In such a case, if the cable is unintentionally disconnected when the power remaining in the removable battery is low, the apparatus may shut down in a short period of time due to insufficient power remaining in the battery.

SUMMARY OF THE INVENTION

Having been conceived in light of the foregoing problem, the present invention realizes a technique that can reduce the occurrence of issues caused by a drop in remaining battery power when a power supply apparatus is connected and power is being supplied.

In order to solve the aforementioned problem, one aspect of the present disclosure provides an electronic apparatus comprising: an obtaining unit configured to obtain, from a battery that supplies power for the electronic apparatus to operate, information about remaining power in the battery; a detecting unit configured to detect a connection with a power supply apparatus that supplies power to the electronic apparatus; a control unit configured to perform control to supply power from the power supply apparatus to the electronic apparatus instead of from the battery, in a case where the connection with the power supply apparatus is detected; and a display control unit configured to cause a display unit to display a warning related to the remaining power in the battery when the remaining power in the battery is less than or equal to a predetermined threshold, in a case where the electronic apparatus operates using the power from the battery, wherein in a case where the connection with the power supply apparatus is detected, the display control unit causes the display unit to display the warning related to the remaining power in the battery when the remaining power in the battery is less than or equal to a second threshold different from the predetermined threshold.

Another aspect of the present disclosure provides a method of controlling an electronic apparatus, the method comprising: obtaining, from a battery that supplies power for the electronic apparatus to operate, information about remaining power in the battery; detecting a connection with a power supply apparatus that supplies power to the electronic apparatus; performing control to supply power from the power supply apparatus to the electronic apparatus instead of from the battery, in a case where the connection with the power supply apparatus is detected; and causing a display unit to display a warning related to the remaining power in the battery when the remaining power in the battery is less than or equal to a predetermined threshold, in a case where the electronic apparatus operates using the power from the battery, wherein in a case where the connection with the power supply apparatus is detected, the display unit is caused to display the warning related to the remaining power in the battery when the remaining power in the battery is less than or equal to a second threshold different from the predetermined threshold.

Still another aspect of the present disclosure provides a non-transitory computer-readable storage medium comprising instructions for performing a method of controlling an electronic apparatus, the method comprising: obtaining, from a battery that supplies power for the electronic apparatus to operate, information about remaining power in the battery; detecting a connection with a power supply apparatus that supplies power to the electronic apparatus; performing control to supply power from the power supply apparatus to the electronic apparatus instead of from the battery, in a case where the connection with the power supply apparatus is detected; and causing a display unit to display a warning related to the remaining power in the battery when the remaining power in the battery is less than or equal to a predetermined threshold, in a case where the electronic apparatus operates using the power from the battery, wherein in a case where the connection with the power supply apparatus is detected, the display unit is caused to display the warning related to the remaining power in the battery when the remaining power in the battery is less than or equal to a second threshold different from the predetermined threshold.

According to the present invention, it is possible to reduce the occurrence of issues caused by a drop in remaining battery power when a power supply apparatus is connected and power is being supplied.

Further features of the present invention will become apparent from the following description of exemplary embodiments (with reference to the attached drawings).

BRIEF DESCRIPTION OF THE DRAWINGS

FIG. 4 is a flowchart illustrating a series of operations involved in the control of a warning display according to the first embodiment.

DESCRIPTION OF THE EMBODIMENTS

First Embodiment

Figure 1:
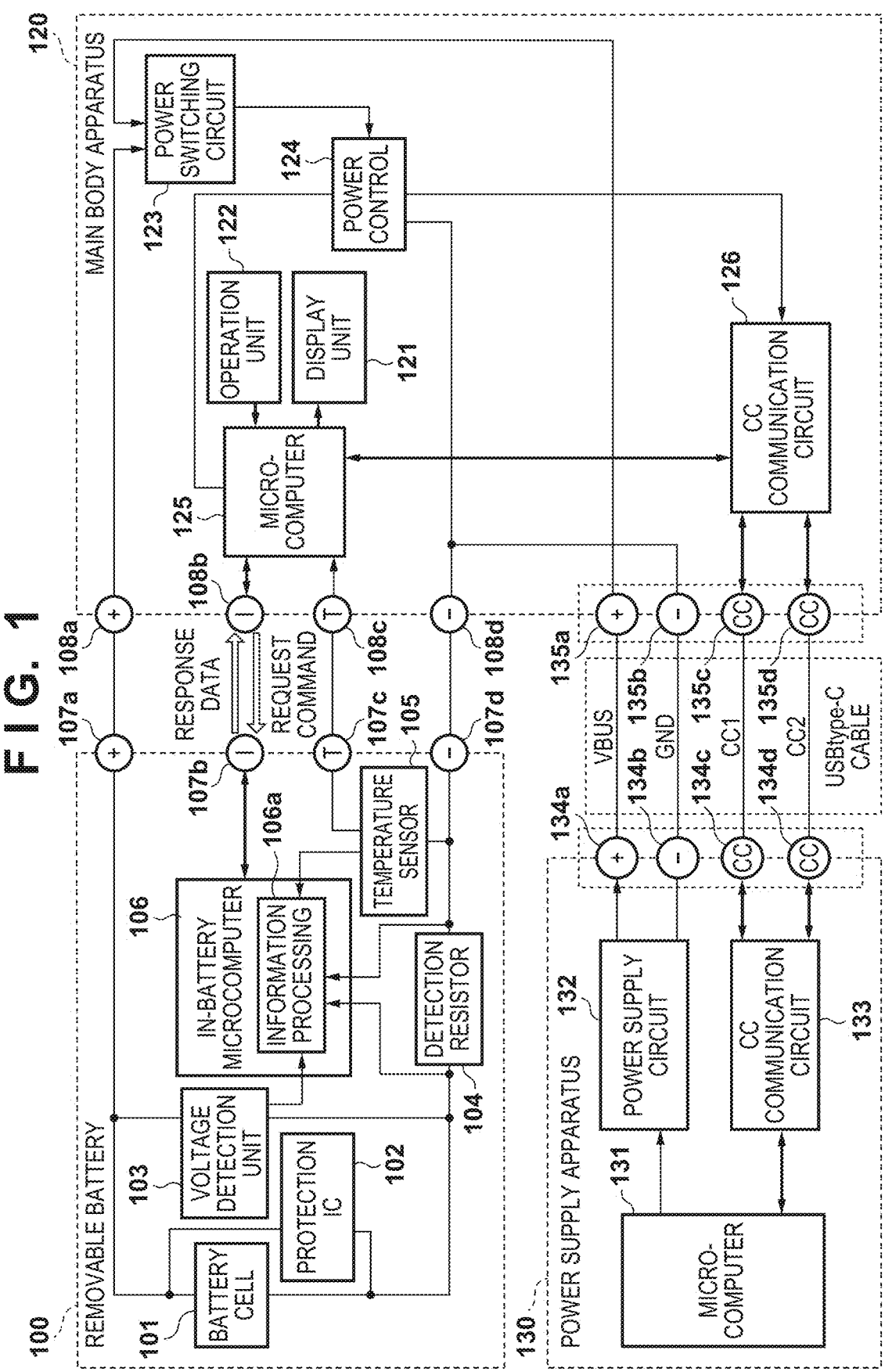
FIG. 1 is a block diagram illustrating an example of the configuration of a system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A commercial video camera in which a battery can be mounted and which can receive power supplied from the exterior will be described hereinafter as an example of an electronic apparatus. However, the present embodiment can be applied not only in recording apparatuses such as video cameras, but also in playback apparatuses, regardless of whether or not the apparatus is for professional use. Furthermore, the present embodiment can be applied in other electronic apparatuses in which a battery can be mounted and which can receive power supplied from the exterior. Such electronic apparatuses may include digital cameras, smartphones, tablet terminals, laptop computers, game consoles, wearable apparatuses, and the like as well as video cameras.

Configuration of Charging System

FIG. 1 illustrates an example of the configuration of a charging system that includes a digital camera according to the present embodiment. Note that one or more of the function blocks illustrated in FIG. 1 may be implemented by hardware such as an ASIC, or may be implemented by software executed by a programmable processor such as a CPU or a GPU. The function blocks may also be realized as a combination of software and hardware.

The charging system according to the present embodiment includes, for example, a removable battery 100, a main body apparatus 120 that is a digital camera, and a power supply apparatus 130 compliant with universal serial bus (USB) Type-C. The removable battery 100 includes a battery cell 101 that generates electromotive force. The removable battery 100 mounted in the main body apparatus 120 supplies power for the main body apparatus 120 to operate. A protection IC 102 controls a protection function used when charging and discharging the battery cell. A voltage detection unit 103 detects the battery voltage, and a detection resistor 104 detects current. A temperature sensor 105 may be constituted by a thermistor, a thermocouple, or the like, and measures the ambient temperature and outputs temperature information. Signals from the voltage detection unit 103, the detection resistor 104, and the temperature sensor 105 are supplied to an in-battery microcomputer 106.

An information processing unit 106a of the in-battery microcomputer 106 performs A/D conversion and current integration on the supplied signals. The removable battery 100 may further include an LED (not shown) that indicates the remaining power in the battery. This LED display can be controlled by the in-battery microcomputer 106, for example.

The main body apparatus 120 is connected to the removable battery 100 by a contact 107 and a contact 108. The main body apparatus 120 receives the power supplied from the removable battery 100 through the contact 107 and the contact 108. A power control unit 124 of the main body apparatus 120 generates necessary voltages based on the supplied power and drives the units of the main body apparatus 120. The power control unit 124 can include, for example, a DC/DC converter, a linear regulator, and the like.

A microcomputer 125 of the main body apparatus 120 includes a CPU, a ROM, a RAM, and the like (described later), and controls the units of the main body apparatus 120. The microcomputer 125 sends request commands to the in-battery microcomputer 106 of the removable battery 100, and receives information such as the remaining battery capacity, the battery voltage, the battery current, and the like from the in-battery microcomputer 106 as response data.

The microcomputer 125 can use the information in the received response data to calculate a remaining usable time, for example. The microcomputer 125 displays the calculated remaining usable time in a display unit 121 such as a liquid crystal display or the like. The microcomputer 125 also controls the main body apparatus as a whole in accordance with input information from an operation unit 122 provided in the main body apparatus 120. The display unit 121 includes a display panel, for example, and displays images, a graphical user interface, and the like in response to instructions from the microcomputer 125. The operation unit 122 is constituted by switches, buttons, a touch panel, or the like, for example, and provides the microcomputer 125 with operations that have been input by the user.

A power switching circuit 123 switches a power supply source between the removable battery 100 and the power supply apparatus 130. For example, when the power supply apparatus 130 is connected while the removable battery 100 is mounted, the power switching circuit 123 switches the power supply source from the removable battery 100 to the power supply apparatus 130. In other words, the power switching circuit 123 performs control such that power is supplied to the main body apparatus 120 from the power supply apparatus 130 instead of the removable battery 100.

The power supply apparatus 130 is connected to the main body apparatus 120 through contacts 134 and 135 and a USB Type-C interface cable, and supplies power to the main body apparatus 120. The power supply apparatus 130 includes a microcomputer 131, a power supply circuit 132 for supplying a VBUS, and a CC communication circuit 133. The CC communication circuit 133 performs bidirectional data communication with a CC communication circuit 126 on the main body apparatus 120 side, detects the connection between the power supply apparatus 130 and the main body apparatus 120, obtains voltage/current information, and the like. For example, the connection of the power supply apparatus 130 is detected by communication based on the USB Power Delivery (PD) standard, which is performed with the main body apparatus 120.

The USB Type-C interface cable includes a GND terminal serving as a ground line, a VBUS terminal serving as a power supply line, a configuration channel (CC) terminal, and the like. The CC terminal is used for bidirectional data communication (what is known as "CC communication"), such as negotiation with the power supply target (power supply negotiation).

Configuration of Main Body Apparatus

Figure 2:
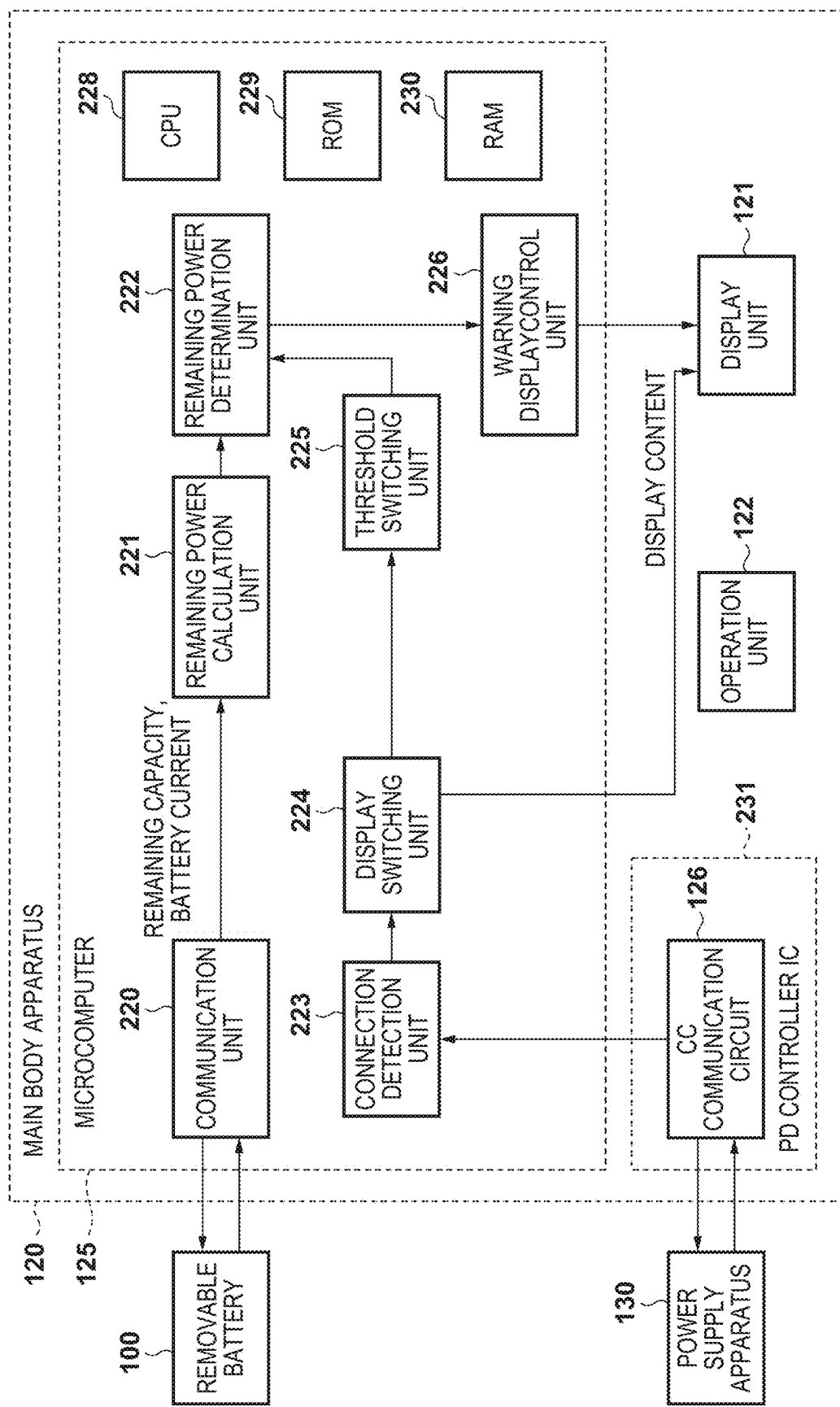
FIG. 2 is a block diagram illustrating an example of the configuration of a main body apparatus according to the first embodiment.

The configuration of the main body apparatus 120 will be described next with reference to FIG. 2. Note that redundant descriptions of the configurations described with reference to FIG. 1 will be omitted.

The microcomputer 125 includes an internal CPU 228, which controls each block of the microcomputer 125 over a bus (not shown). The CPU 228 may include at least one processor. The CPU 228 loads computer programs stored in a ROM 229 into a RAM 230 and executes the programs.

The ROM 229 may be a non-volatile memory, including a semiconductor memory, for example, and a partial region of the ROM 229 may be used to hold system states and the like for backup purposes. The RAM 230 is a volatile memory, for example, and temporarily stores computation results of the CPU 228 and the like.

A communication unit 220 obtains the remaining capacity of the removable battery 100 and the battery current through communication with the removable battery 100. A remaining power calculation unit 221 calculates the remaining power in the removable battery 100 based on the remaining capacity and battery current obtained. A remaining power determination unit 222 determines whether the remaining power in the battery, calculated by the remaining power calculation unit 221, is less than or equal to a specified threshold.

The CC communication circuit 126, which is within a PD controller IC 231, performs negotiation with the power supply apparatus 130 through the configuration channel (CC) terminal of the USB Type-C interface cable. Through this, the detection of apparatus connections, the direction of the supply of power, current/voltage settings, and the like are determined between the connected apparatuses.

A connection detection unit 223 detects a connection based on connection information of the power supply apparatus 130, communicated to the CPU 228 from the CC communication circuit 126. A display switching unit 224 is a block that switches a display pertaining to the power supply, and when a connection with the power supply apparatus 130 is detected, switches a display of the remaining battery power in the display unit 121 to a connection display for the power supply apparatus 130. A threshold switching unit 225 switches a threshold for determining whether to display a warning notification related to the remaining battery power, according to the present embodiment. For example, the threshold switching unit 225 may switch the threshold in response to the connection with the power supply apparatus 130 being detected through a notification made by the connection detection unit 223 or the like.

A warning display control unit 226 determines whether to switch the display of the warning notification based on a result of the determination by the remaining power determination unit 222, and causes the display unit 121 to display the warning display in accordance with the determination result. For example, when the main body apparatus 120 is operating using power from the removable battery 100, the warning display control unit 226 can cause the display unit 121 to display a first warning related to the remaining power in the battery when the remaining power in the battery is determined to be less than or equal to the threshold. On the other hand, when the connection with the power supply apparatus 130 is detected and power supplied from the power supply apparatus is being received, the warning display control unit 226 causes the display unit 121 to display a second warning related to the remaining power in the battery when the remaining power in the battery is determined to be less than or equal to the threshold.

Figure 3A:
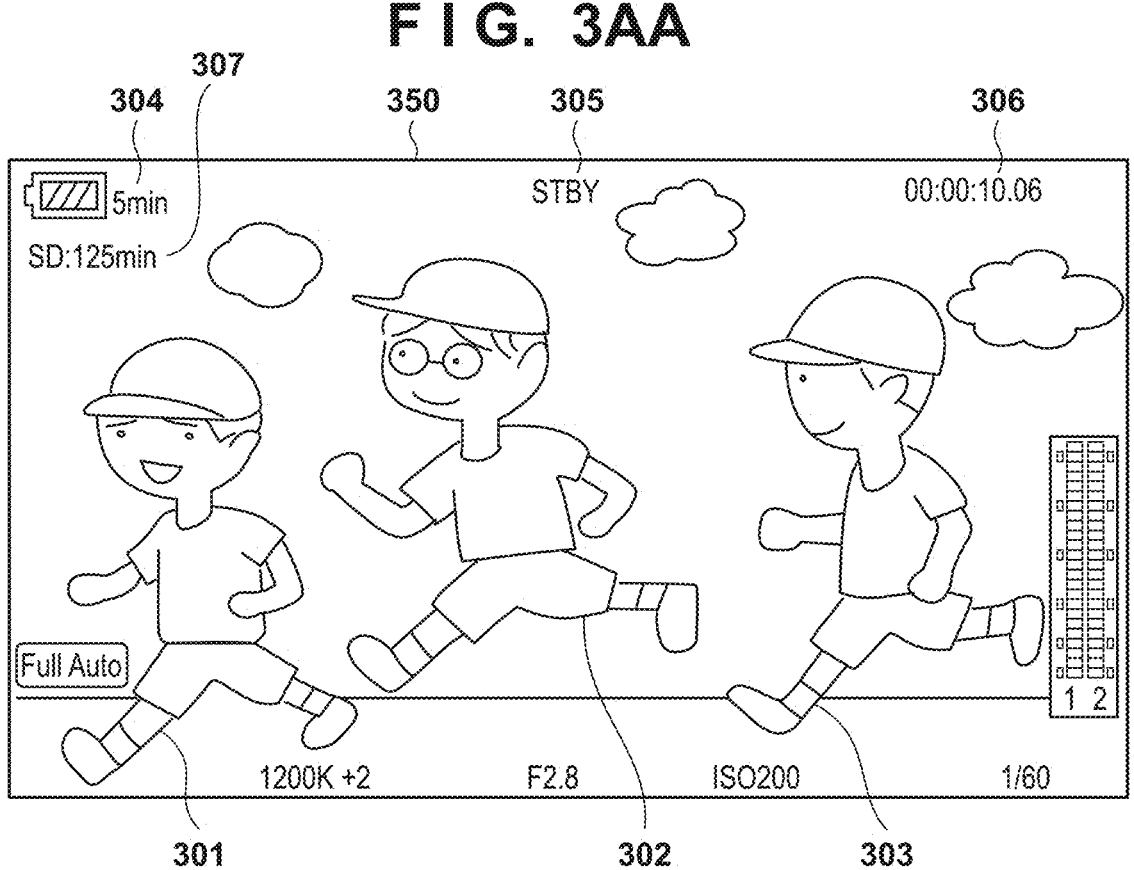
FIGS. 3AA and 3AB are diagrams illustrating an example of display screens indicating a power state according to the first embodiment.
Figure 3A:
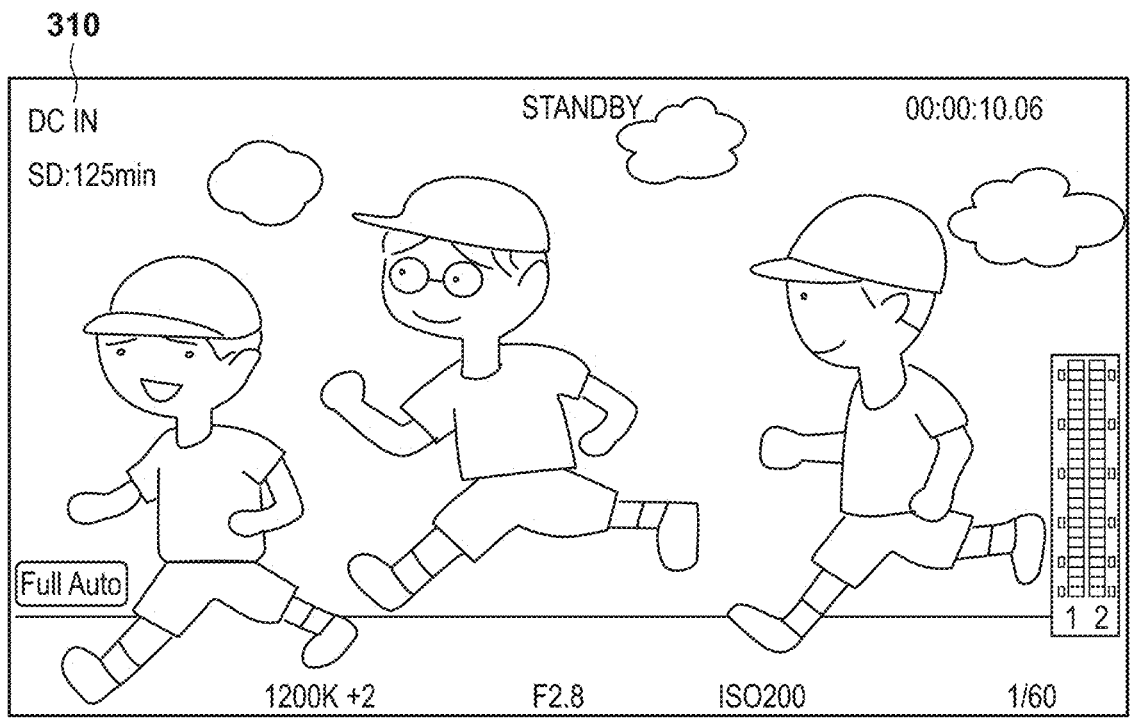

Examples of screen displays according to the present embodiment will be described next with reference to FIGS. 3AA to 3AB and 3BA to 3BB. FIG. 3AA is a diagram illustrating an example of a screen displayed in the display unit 121 at the time of shooting. In this example, image data obtained by an image capturing unit (not shown) provided in the main body apparatus 120 is displayed in an overall shooting screen 350, and subjects 301, 302, and 303 are displayed. The image data obtained by the image capturing unit is loaded into the RAM 230 and displayed in the display unit 121 by the CPU 228. A remaining battery time 304, a recording state 305, a shooting time code 306, and an SD card recordable time 307 are all displayed in an on-screen display (OSD) in the overall shooting screen 350. The OSD is loaded into the RAM 230, and the CPU 228 overlays the data of the OSD on the image data obtained from the image capturing unit, and displays those items in the display unit 121. In the OSD display of the overall shooting screen 350, the remaining battery time 304 indicates a remaining length of time for which shooting is possible, for example, in accordance with the remaining battery power of the removable battery 100 mounted in the main body apparatus 120.

FIG. 3AB illustrates an example of a screen displayed in the display unit 121 when the main body apparatus 120 detects a connection with a power supply apparatus compliant with USB Type-C (i.e., the power supply apparatus 130). In this state, the main body apparatus 120 switches the display of the OSD from a state in which the remaining battery time 304 is displayed, as illustrated in FIG. 3AA, to a state in which an external power supply connection display 310 is displayed. The external power supply connection display 310 is a display indicating a state in which the main body apparatus 120 detects a connection with an external power supply apparatus.

Figure 3B:
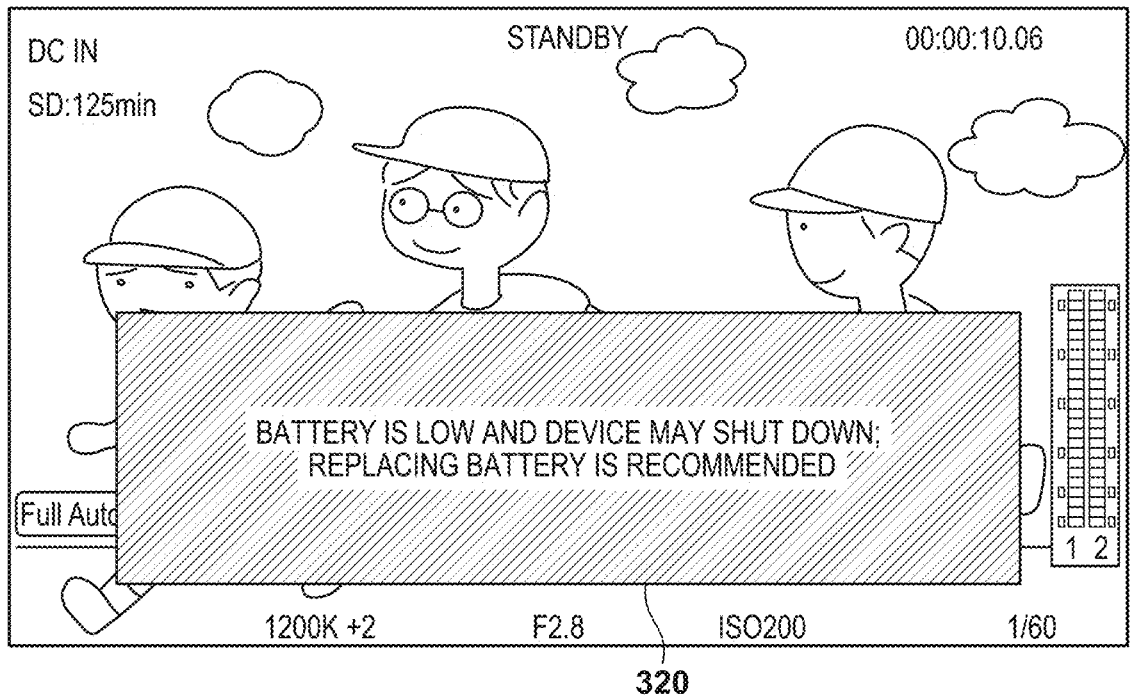
FIGS. 3BA and 3BB are diagrams illustrating an example of warning notification display screens according to the first embodiment.
Figure 3B:
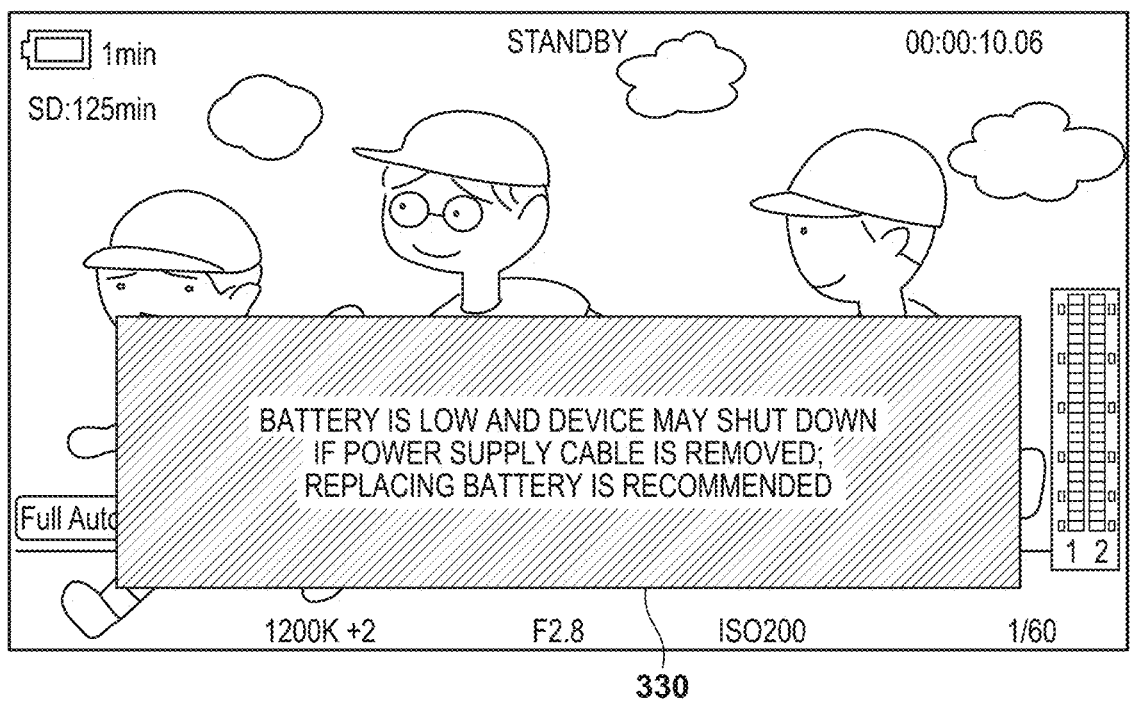

FIG. 3BA illustrates an example of a screen in which a warning display 320 prompting the battery to be replaced is displayed as an OSD in the display unit 121. For example, the CPU 228 causes the warning display 320 to be displayed when both the removable battery 100 and the power supply apparatus 130 are connected to the main body apparatus 120, and the result of obtaining the remaining power information of the removable battery 100 indicates less than or equal to a predetermined threshold ("A1", here). In the warning display 320, a message is displayed in the overall shooting screen 350 which reads, for example, "the battery is low and the device may shut down if the power supply cable is removed. Replacing the battery is recommended". The warning display 320 includes, for example, a message indicating a risk that can arise if the connection with the power supply apparatus is lost, and a message prompting the user to replace the battery. Note that the CPU 228 may further display a remaining battery time or a remaining power gauge for the battery when the warning display 320 is displayed. This makes it possible for the user to intuitively grasp the necessity and urgency of replacing the battery by providing a visual estimate of the remaining power in the battery.

On the other hand, FIG. 3BB illustrates an example of a screen in which a warning display 330 prompting the battery to be replaced is displayed as an OSD in the display unit 121. For example, the CPU 228 causes the warning display 330 to be displayed when the removable battery 100 is connected to the main body apparatus 120 but the connection with the power supply apparatus 130 is not detected, and the result of obtaining the remaining power information of the removable battery 100 indicates less than or equal to a predetermined threshold ("A2", here). The warning display 330 includes a message indicating the risk of the remaining battery power being low and a message prompting the user to replace the battery, such as "the battery is low and the device may shut down. Replacing the battery is recommended".

The present embodiment describes a case where the warning display 320 and the warning display 330 are displayed as text as an example. However, the content of the warning display 320 may be expressed as text, or may be expressed as images such as icons, graphics, or the like. The CPU 228 may also output audio corresponding to the above-described content of the warning display 320 from an audio output unit (not shown) in addition to or instead of the display in the display unit 121.

Series of Operations Involved in Control of Warning Display in Main Body Apparatus A series of operations involved in the control of the warning display, performed by the main body apparatus 120, will be described with reference to FIG. 4. Note that this series of operations is implemented by the CPU 228 loading a computer program stored in the ROM 229 into the RAM 230 and executing the program so as to realize the functions of the units in the microcomputer 125 illustrated in FIG. 2. Additionally, this series of operations is started, for example, when the CPU 228 detects that the removable battery 100 is connected to the main body apparatus 120 and that a power switch of the main body apparatus 120 is on.

In step S401, the CPU 228 obtains information on the remaining power in the removable battery 100 (the remaining power information). For example, the CPU 228 obtains the remaining capacity and the battery current from the removable battery 100 as the remaining power information of the battery (e.g., by the communication unit 220).

In step S402, the CPU 228 displays the remaining battery time in the display unit 121. For example, the CPU 228 calculates the remaining power in the removable battery 100 based on the remaining capacity and the battery current (e.g., by the remaining power calculation unit 221), and displays the remaining battery time 304 (illustrated in FIG. 3AA) in the display unit 121 in accordance with the calculated remaining power.

In step S403, the CPU 228 determines whether a USB PD connection with the power supply apparatus 130 is detected. For example, the CPU 228 performs negotiation through CC communication between the power supply apparatus 130 and the main body apparatus 120 via the CC communication circuit 126. Next, it is determined whether a USB PD connection with the power supply apparatus 130 is detected (e.g., by the connection detection unit 223). The CPU 228 moves the sequence to step S404 if a USB PD connection with the power supply apparatus 130 is detected, and to step S410 if not.

In step S410, the CPU 228 determines, based on the remaining power information obtained in step S401, whether the remaining battery power in the removable battery 100 is less than or equal to the threshold A1 initially defined for the removable battery 100 (e.g., by the remaining power determination unit 222). Here, the threshold A1 is a reference value for determining whether to display the warning notification when the main body apparatus 120 is operating using the power from the removable battery 100 and the remaining battery power has dropped. The CPU 228 moves the sequence to step S411 if the remaining power in the battery is determined to be less than or equal to the threshold A1, and to step S412 if not.

In step S411, the CPU 228 displays a warning in the display unit 121. For example, the CPU 228 displays the warning display 330 illustrated in FIG. 3BB in the overall shooting screen 350 (e.g., by the warning display control unit 226). The CPU 228 then ends the series of operations illustrated in FIG. 4. In step S412, the CPU 228 returns the sequence to step S401 without displaying a warning.

In step S404, the CPU 228 switches the display in the display unit 121 to a USB PD connection display. For example, the CPU 228 switches the display in the display unit 121 to the external power supply connection display 310 illustrated in FIG. 3AB (e.g., by the display switching unit 224). The external power supply connection display 310 indicates that the apparatus is operating on power from an external power supply (e.g., supplied from a power supply apparatus or the like).

In step S405, the CPU 228 switches the initially-defined threshold A1 to the threshold A2 (e.g., by the threshold switching unit 225). The threshold A2 is assumed to be lower than the threshold A1. The threshold A1 is a reference value for when power is supplied only from the removable battery 100. On the other hand, the threshold A2 is a reference value for when a connection with the power supply apparatus 130 is detected in addition to the removable battery 100 (i.e., when power is also supplied from the power supply apparatus 130, which is an external apparatus). When both the removable battery 100 and the power supply apparatus 130 are connected to the main body apparatus 120, the power supply from the power supply apparatus 130 is prioritized (i.e., power from the power supply apparatus 130 is used instead of from the battery when a connection with the power supply apparatus is detected). In this case, the risk of a shutdown due to a drop in the remaining power is lower than when power is supplied from the removable battery 100 alone. As such, the threshold A2 can be set to a lower constant than the threshold A1 in order to make the warning notifications less annoying. In this manner, different thresholds are used for when the main body apparatus 120 operates using power from the battery, and for when a connection with the power supply apparatus is detected (power is being supplied from the power supply apparatus). This makes it possible to control the display of the warning according to criteria which differ according to the risk. Setting the threshold A2 to be lower than the threshold A1 in particular makes it possible to reduce unnecessary warning displays in situations where the risk associated with the remaining power in the battery is low.

In step S406, the CPU 228 obtains the remaining power information of the removable battery 100 again (e.g., by the communication unit 220). In step S407, the CPU 228 determines whether the remaining battery power is less than or equal to a threshold. Note that the CPU 228 calculates the remaining battery power in the removable battery 100 based on the remaining power information (e.g., by the remaining power calculation unit 221), and determines whether the remaining battery power is less than or equal to the threshold A2 (e.g., by the remaining power determination unit 222). The CPU 228 moves the sequence to step S408 if the remaining battery power is determined to be less than or equal to the threshold A2, and to step S409 if not.

In step S408, the CPU 228 displays a warning in the display unit 121. For the warning, for example, the display unit 121 is caused to display the warning display 320 prompting the battery to be replaced when the (USB Type- C) power supply apparatus is connected, as illustrated in FIG. 3BA. The CPU 228 then ends the series of operations illustrated in FIG. 4. In step S409, the CPU 228 returns the sequence to step S403 without displaying a warning.

As described above, in the main body apparatus 120, to which both the removable battery 100 and the power supply apparatus 130 are connected, the thresholds are switched, and different thresholds are used, for when only the removable battery 100 is connected, and for when the connection with the power supply apparatus 130 is also detected. Here, the threshold is a threshold for determining whether to display the warning notification, and for example, when a connection with the power supply apparatus 130 is detected, the threshold is switched from the predetermined threshold A1 to the second threshold A2. Then, if the remaining battery power is determined to be less than or equal to a threshold (e.g., less than or equal to A2), the CPU 228 displays the warning display 320, which includes a display indicating a risk arising when the connection with the power supply apparatus is lost. This makes it possible to control the display of the warning according to criteria which differ according to the risk, for when the main body apparatus 120 operates using power from the battery, and for when a connection with the power supply apparatus is detected (power is being supplied from the power supply apparatus). In other words, a warning prompting the battery to be replaced can be displayed according to appropriate criteria (even when the supply of power from the power supply apparatus 130 is prioritized over the supply of power from the removable battery 100). For example, when the video camera is being operated while the remaining battery power is low, the risk of issues caused by the apparatus shutting down (shooting being interrupted, recorded data being corrupted, and the like) if the USB interface cable is disconnected can be reduced. In other words, it is possible to reduce the occurrence of issues caused by a drop in remaining battery power when a power supply apparatus is connected and power is being supplied.

Second Embodiment

A second embodiment will be described next. The main body apparatus of the present embodiment differs from that of the first embodiment in that the warning display is controlled in accordance with an operating mode of the main body apparatus. However, in other respects, the configuration may be substantially identical as in the first embodiment. As such, configurations identical or substantially identical to those in the first embodiment will be given the same reference signs, and redundant descriptions omitted, with attention focused on the differences.

As described above, if the remaining battery power of the removable battery 100 drops while the supply of power is being received from the connected power supply apparatus 130, the occurrence of issues caused by a drop in the remaining battery power can be reduced by displaying the warning display 320 prompting the battery to be replaced. However, the warning display prompting the battery to be replaced may be annoying to the user if the display is made frequently. Accordingly, in the present embodiment, the warning display is further made taking into account the operating mode of the main body apparatus 120, in order to make the display less annoying. For example, if the main body apparatus 120 is a commercial video camera, it is most important to avoid situations where the apparatus shuts down while a moving image is being recorded. In such a case, the notification using the warning display is only made when moving images are being recorded. This makes it possible to reduce the frequency at which the warning notification is displayed and improve the usability for the user.

Configuration of Main Body Apparatus

Figure 5:
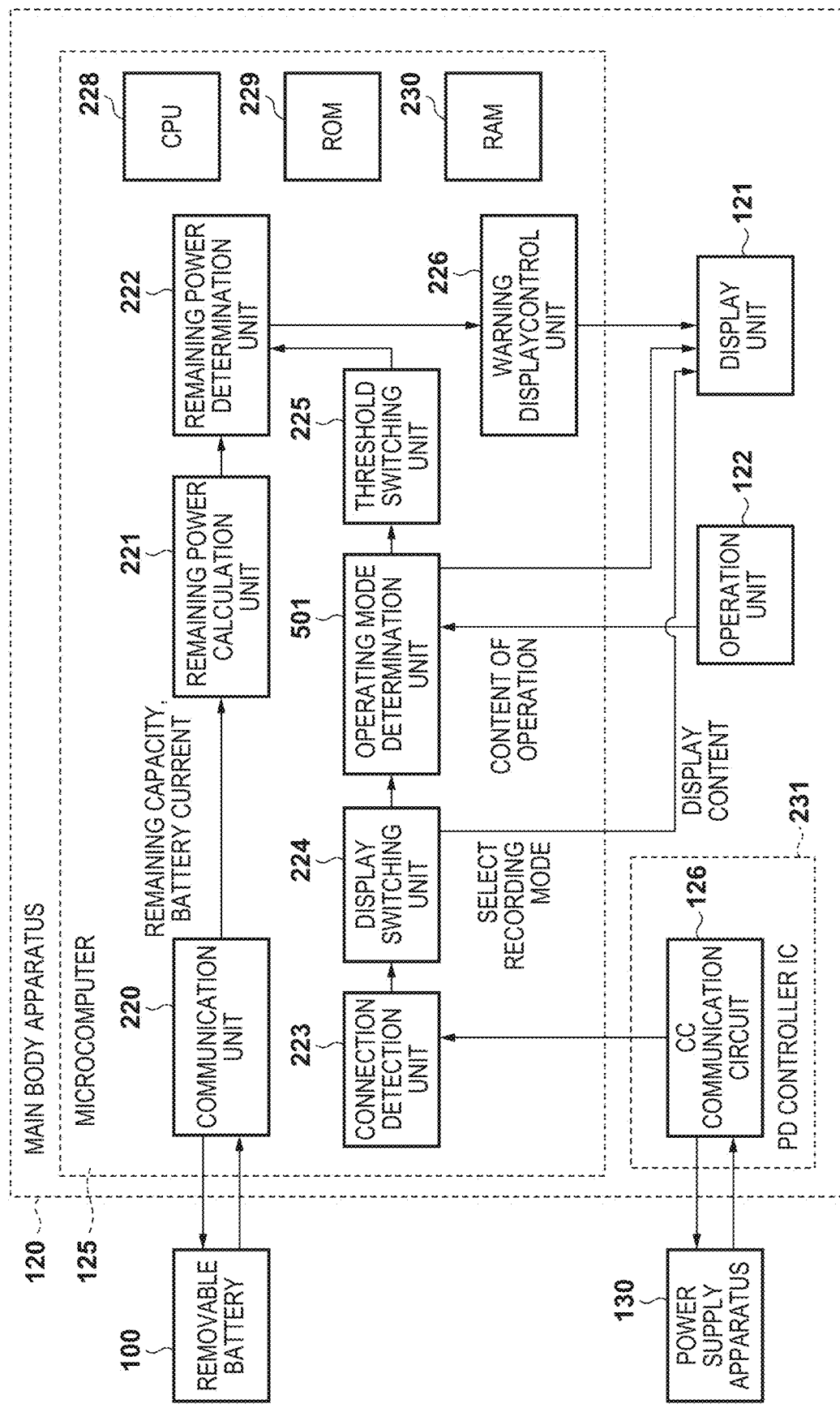
FIG. 5 is a block diagram illustrating an example of the configuration of a main body apparatus according to a second embodiment.

An example of the configuration of the main body apparatus 120 will be described with reference to FIG. 5. In FIG. 5, an operating mode determination unit 501 has been added to the configuration described in the first embodiment. The following will describe a case where the warning display is controlled in accordance with the operating mode of the video camera as an example.

The operation unit 122 accepts a user operation for selecting a mode. When the main body apparatus 120 accepts an operation for selecting a mode, the main body apparatus 120 is started up and shifts from a state in which a moving image is not being recorded (e.g., a standby mode) to a moving image recording state (also called a "recording mode").

When an operating mode is selected through the operation unit 122, the operating mode determination unit 501 determines the selected operating mode. In the foregoing first embodiment, the threshold is switched from A1 to A2 by the threshold switching unit 225 in response to a notification by the display switching unit 224 (i.e., detecting a connection with the power supply apparatus). On the other hand, in the second embodiment, whether to switch the threshold by the threshold switching unit 225 is determined taking into account not only the result of the determination by the display switching unit 224, but also the result of the determination by the operating mode determination unit 501.

Figure 6:
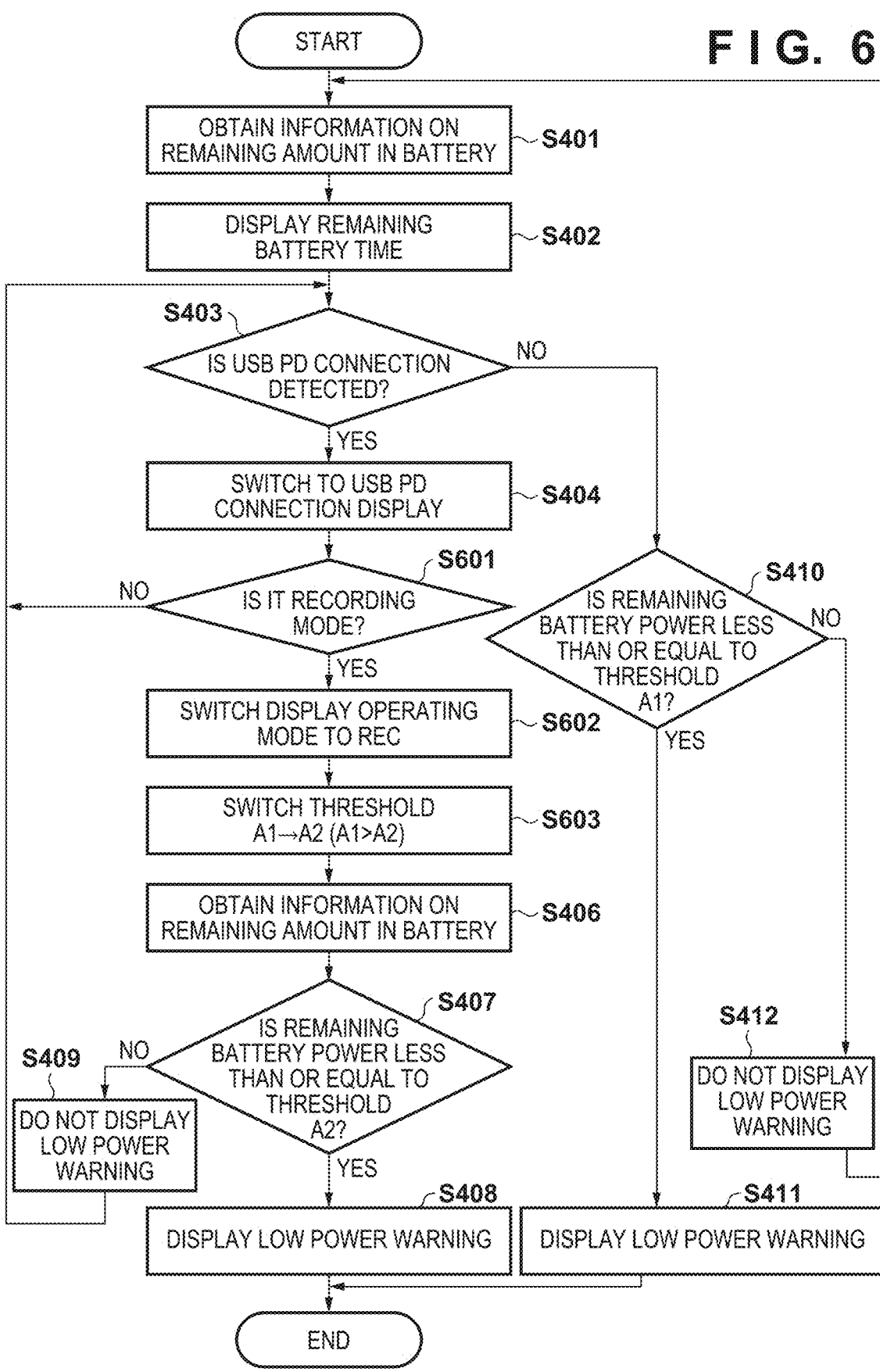
FIG. 6 is a flowchart illustrating a series of operations involved in the control of a warning display according to the second embodiment.

Series of Operations Involved in Control of Warning Display in Main Body Apparatus A series of operations involved in the control of the warning display, performed by the main body apparatus 120, will be described next with reference to FIG. 6. Note that this series of operations is implemented by the CPU 228 loading a computer program stored in the ROM 229 into the RAM 230 and executing the program so as to realize the functions of the units in the microcomputer 125 illustrated in FIG. 2. Additionally, this series of operations is started, for example, when the CPU 228 detects that the removable battery 100 is connected to the main body apparatus 120 and that a power switch of the main body apparatus 120 is on.

The CPU 228 performs the processing of steps S401 to S404 in the same manner as in the first embodiment. Through the processing up to step S404, the CPU 228 has switched the display in the display unit 121 to the external power supply connection display 310 illustrated in FIG. 3AB (e.g., by the display switching unit 224). In other words, the display unit 121 indicates that the apparatus is operating on power from an external power supply (e.g., supplied from a power supply apparatus or the like).

In step S601, the CPU 228 determines whether the operating mode of the main body apparatus 120 is set to the recording mode (i.e., whether the main body apparatus is operating in the recording mode). The CPU 228 moves the sequence to step S602 the operating mode of the main body apparatus 120 is determined to be set to the recording mode, and to step S409 if not.

Figure 7A:
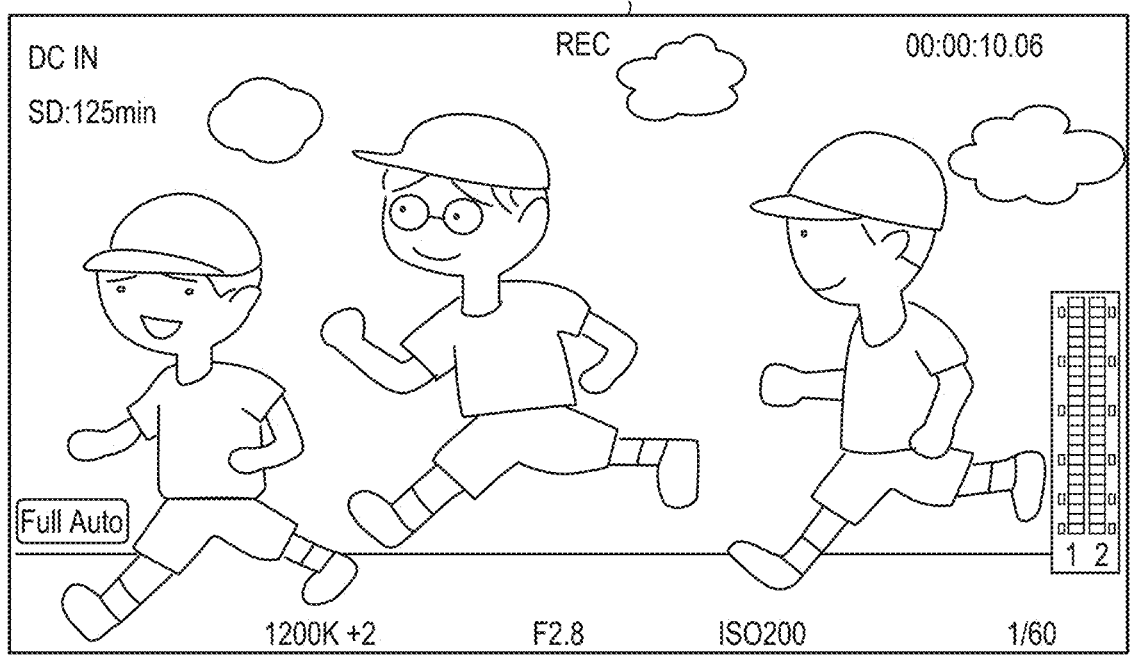
FIGS. 7A and 7B are examples of warning notification display screens according to the second embodiment.

In step S602, the CPU 228 switches a display indicating the operating mode illustrated in FIG. 7A (a recording state 710) from "STANDBY", which indicates the standby mode, to "REC", which indicates represents the recording mode.

In step S603, the CPU 228 switches the threshold for determining whether to display the warning notification from A1 to A2 (because a connection with the power supply apparatus has been detected, and the operating mode of the main body apparatus 120 is determined to be the recording mode, in steps S403 and S601, respectively). The CPU 228 then executes the processing of steps S406 and later in the same manner as the processing of steps S406 to S412 according to the first embodiment.

Figure 7B:
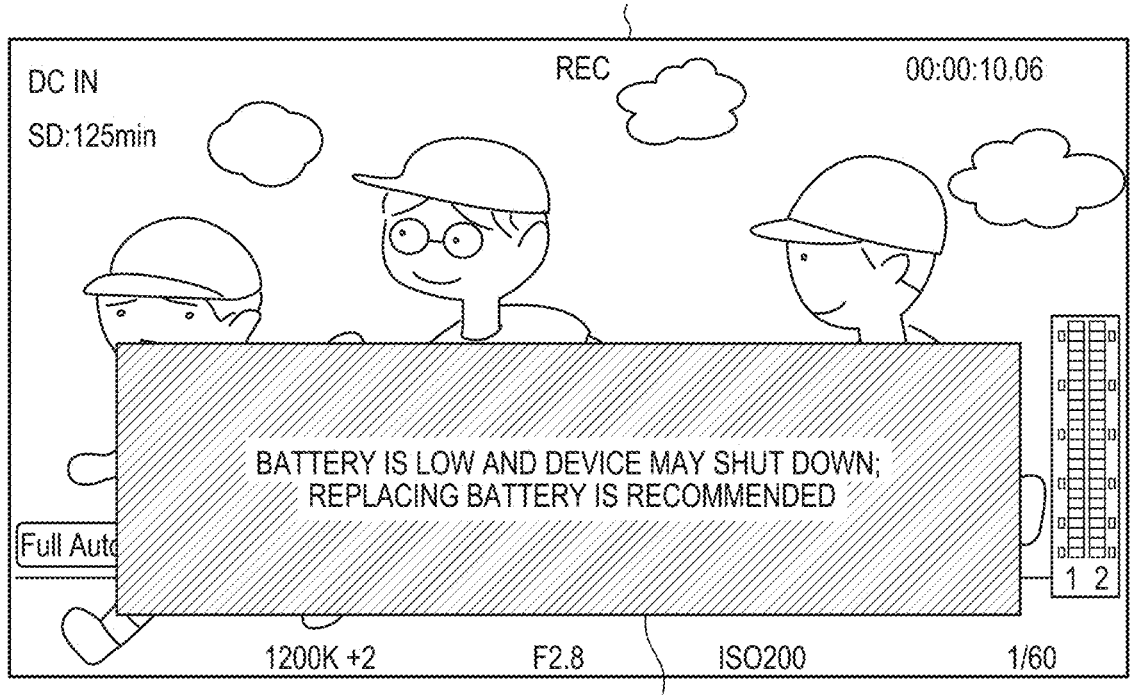

In this manner, in the present embodiment, when both the removable battery 100 and the power supply apparatus 130 are connected, whether the operating mode of the main body apparatus 120 is a specific operating mode (e.g., the recording mode) is determined. In other words, when a connection with the power supply apparatus 130 is detected and the operating mode is also a specific operating mode, the warning display determination is made using the threshold A2, which is different from the threshold A1. Then, if the remaining battery power is determined to be less than or equal to the threshold switched to, a warning display 711, illustrated in FIG. 7B, is displayed. In the warning display illustrated in FIG. 7B, a message is displayed in the display unit 121 which reads, for example, "the battery is low and the device may shut down if the power supply cable is removed. Replacing the battery is recommended". This warning display includes, for example, a message indicating a risk that can arise if the connection with the power supply apparatus is lost, and a message prompting the user to replace the battery. On the other hand, even if a connection with the power supply apparatus 130 is detected, the warning display is not made if the operating mode of the main body apparatus 120 is an operating mode different from the specific operating mode (e.g., the recording mode). This makes it possible to limit the notification made by the warning display to a specific operating mode, reduce the frequency at which the warning display is displayed, and improve the usability for the user.

In the second embodiment, the warning display is not made if the operating mode of the main body apparatus 120 is an operating mode different from the specific operating mode (e.g., the recording mode). However, the warning display may be controlled using a threshold A3, which is lower than the threshold A2 used in the recording mode, if the operating mode of the main body apparatus 120 is an operating mode different from the specific operating mode. For example, the CPU 228 causes the display unit 121 to display a warning related to the remaining power in the battery when the remaining power in the battery is less than or equal to the threshold A3, which is lower than the threshold A2. This makes it possible to reduce the frequency at which the warning display is displayed and improve the usability for the user in an operating mode that is not the specific operating mode.

The foregoing describes a case where the removable battery 100 is configured to be removable from the main body apparatus 120 as an example. However, a battery built into the main body apparatus 120 can also be used in the foregoing embodiments. In this case, the warning display can include a display prompting the battery to be charged instead of a display prompting the battery to be replaced.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-096468, filed Jun. 12, 2023 which is hereby incorporated by reference herein in its entirety.

What is claimed is:

1. An electronic apparatus comprising:
an obtaining unit configured to obtain, from a battery that supplies power for the electronic apparatus to operate, information about remaining power in the battery;
a detecting unit configured to detect a connection with a power supply apparatus that supplies power to the electronic apparatus;
a control unit configured to perform control to supply power from the power supply apparatus to the electronic apparatus instead of from the battery, in a case where the connection with the power supply apparatus is detected; and
a display control unit configured to cause a display unit to display a warning related to the remaining power in the battery when the remaining power in the battery is less than or equal to a predetermined threshold, in a case where the electronic apparatus operates using the power from the battery,
wherein in a case where the connection with the power supply apparatus is detected, the display control unit causes the display unit to display the warning related to the remaining power in the battery when the remaining power in the battery is less than or equal to a second threshold different from the predetermined threshold,
wherein in a case where the connection with the power supply apparatus is detected, and an operating mode of the electronic apparatus is a specific operating mode, the display control unit causes the display unit to display the warning related to the remaining power in the battery when the remaining power in the battery is less than or equal to the second threshold, and
wherein in a case where the connection with the power supply apparatus is detected, and the operating mode of the electronic apparatus is an operating mode different from the specific operating mode, the display control unit causes the display unit to display the warning related to the remaining power in the battery when the remaining power in the battery is less than or equal to a third threshold lower than the second threshold.

\* \* \* \* \*